United States Patent
Banerjee et al.

(10) Patent No.: US 9,753,853 B2
(45) Date of Patent: Sep. 5, 2017

(54) METHODS AND SYSTEMS FOR CACHE MANAGEMENT IN STORAGE SYSTEMS

(71) Applicant: NETAPP, INC., Sunnyvale, CA (US)

(72) Inventors: Arindam Banerjee, Superior, CO (US); Donald R. Humlicek, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 93 days.

(21) Appl. No.: 14/510,785

(22) Filed: Oct. 9, 2014

(65) Prior Publication Data

US 2016/0103764 A1    Apr. 14, 2016

(51) Int. Cl.
| | |
|---|---|
| G06F 12/08 | (2016.01) |
| G06F 3/06 | (2006.01) |
| G06F 12/084 | (2016.01) |
| G06F 12/0864 | (2016.01) |
| G06F 12/0873 | (2016.01) |

(52) U.S. Cl.
CPC ............ *G06F 12/084* (2013.01); *G06F 3/061* (2013.01); *G06F 3/0644* (2013.01); *G06F 3/0673* (2013.01); *G06F 12/0864* (2013.01); *G06F 12/0873* (2013.01); *G06F 2212/1021* (2013.01); *G06F 2212/1044* (2013.01); *G06F 2212/312* (2013.01); *G06F 2212/604* (2013.01); *G06F 2212/608* (2013.01)

(58) Field of Classification Search
CPC ........... G06F 12/084; G06F 2212/1021; G06F 2212/1044; G06F 2212/604; G06F 2212/608; G06F 3/061; G06F 3/0644; G06F 3/0673

See application file for complete search history.

(56) References Cited

U.S. PATENT DOCUMENTS

| 5,860,131 A * | 1/1999 | Daub .................. G06F 12/0866 711/118 |
| 6,460,122 B1 | 10/2002 | Otterness et al. |
| 8,539,155 B1 | 9/2013 | Miao et al. |
| 2003/0159001 A1 | 8/2003 | Chalmer et al. |

(Continued)

OTHER PUBLICATIONS

"Universal and Perfect Hashing" from CMU. Also avaliable at https://www.cs.cmu.edu/~avrim/451f11/lectures/lect1004.pdf.*

(Continued)

*Primary Examiner* — Ann J Lo
*Assistant Examiner* — Jane Wei
(74) *Attorney, Agent, or Firm* — Haynes and Boone, LLP

(57) ABSTRACT

Methods and systems for managing caching mechanisms in storage systems are provided where a global cache management function manages multiple independent cache pools and a global cache pool. As an example, the method includes: splitting a cache storage into a plurality of independently operating cache pools, each cache pool comprising storage space for storing a plurality of cache blocks for storing data related to an input/output ("I/O") request and metadata associated with each cache pool; receiving the I/O request for writing a data; operating a hash function on the I/O request to assign the I/O request to one of the plurality of cache pools; and writing the data of the I/O request to one or more of the cache blocks associated with the assigned cache pool. In an aspect, this allows efficient I/O processing across multiple processors simultaneously.

21 Claims, 10 Drawing Sheets

(56) References Cited

U.S. PATENT DOCUMENTS

| | | |
|---|---|---|
| 2003/0182503 A1 | 9/2003 | Leong et al. |
| 2008/0270704 A1 | 10/2008 | He et al. |
| 2010/0325277 A1 | 12/2010 | Muthiah et al. |
| 2011/0060880 A1* | 3/2011 | Hosoda ............... G06F 12/0811 711/124 |
| 2013/0091330 A1* | 4/2013 | Mital .................... G06F 12/084 711/130 |
| 2014/0173211 A1* | 6/2014 | Loh ..................... G06F 12/0842 711/129 |

OTHER PUBLICATIONS

PCT International Searching Authority—US, PCT Notification of Transmittal of the International Search Report and the Written Opinion of the International Searching Authority, or the Declaration, dated Jan. 8, 2016, for Application No. PCT/US2015/054275, 10 pages.

* cited by examiner

METHODS AND SYSTEMS FOR CACHE MANAGEMENT IN STORAGE SYSTEMS

TECHNICAL FIELD

The present disclosure relates to cache management in storage systems and, more specifically, to handling cache management in a parallel processing environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices. The storage system may be implemented as a clustered storage system having a plurality of nodes. The storage system can be presented to client systems as virtual storage systems.

Caching of input/output (I/O) requests is used to read and write data in storage systems. Typically, processing of I/Os using cache management routines comprise a significant portion of the overall I/O processing and handling. Cache management operations—such as allocating cache blocks, managing data, inserting a cache block into a hash list, and managing various dirty cache lists—are not only processor (CPU) intensive but are also important for successfully processing I/O requests. Cache management operations are resource intensive because they involve manipulating multiple lists, queues, hash tables and others during an I/O operation and maintaining cache related statistics.

In multi-processor environments, typical cache designs/operations become a bottleneck, as cache management operations often are single threaded or managed using locks. Managing cache related operations via locks can be suboptimal for I/O processing, especially in a multi-processor and multi-storage node environment because a lock causes contention (thereby increasing response times) and may in some situations invalidate a cache. Continuous efforts are being made to improve caching, particularly with respect to multi-processor environments.

SUMMARY

In one aspect, a machine implemented method is provided. The method includes splitting a cache storage into a plurality of independently operating cache pools, each cache pool comprising storage space for storing a plurality of cache blocks for storing data related to an input/output ("I/O") request and metadata associated with each cache pool; receiving the I/O request for writing data; operating a hash function on the I/O request to assign the I/O request to one of the plurality of cache pools; and writing the data of the I/O request to one or more of the cache blocks associated with the assigned cache pool.

In another aspect, a non-transitory, machine readable storage medium having stored thereon instructions for performing a method is provided. The machine executable code which when executed by at least one machine, causes the machine to: split a cache storage into a plurality of independently operating cache pools, each cache pool comprising storage space for storing a plurality of cache blocks for storing data related to an input/output ("I/O") request and metadata associated with each cache pool; receive the I/O request for writing a data; operate a hash function on the I/O request to assign the I/O request to one of the plurality of cache pools; and write the data of the I/O request to one or more of the cache blocks associated with the assigned cache pool.

In yet another aspect, a system having a memory containing machine readable medium comprising machine executable code having stored thereon instructions is provided. A processor module coupled to the memory is configured to execute the machine executable code to: split a cache storage into a plurality of independently operating cache pools, each cache pool comprising storage space for storing a plurality of cache blocks for storing data related to an input/output ("I/O") request and metadata associated with each cache pool; receive the I/O request for writing a data; operate a hash function on the I/O request to assign the I/O request to one of the plurality of cache pools; and write the data of the I/O request to one or more of the cache blocks associated with the assigned cache pool.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

Figure 1A:
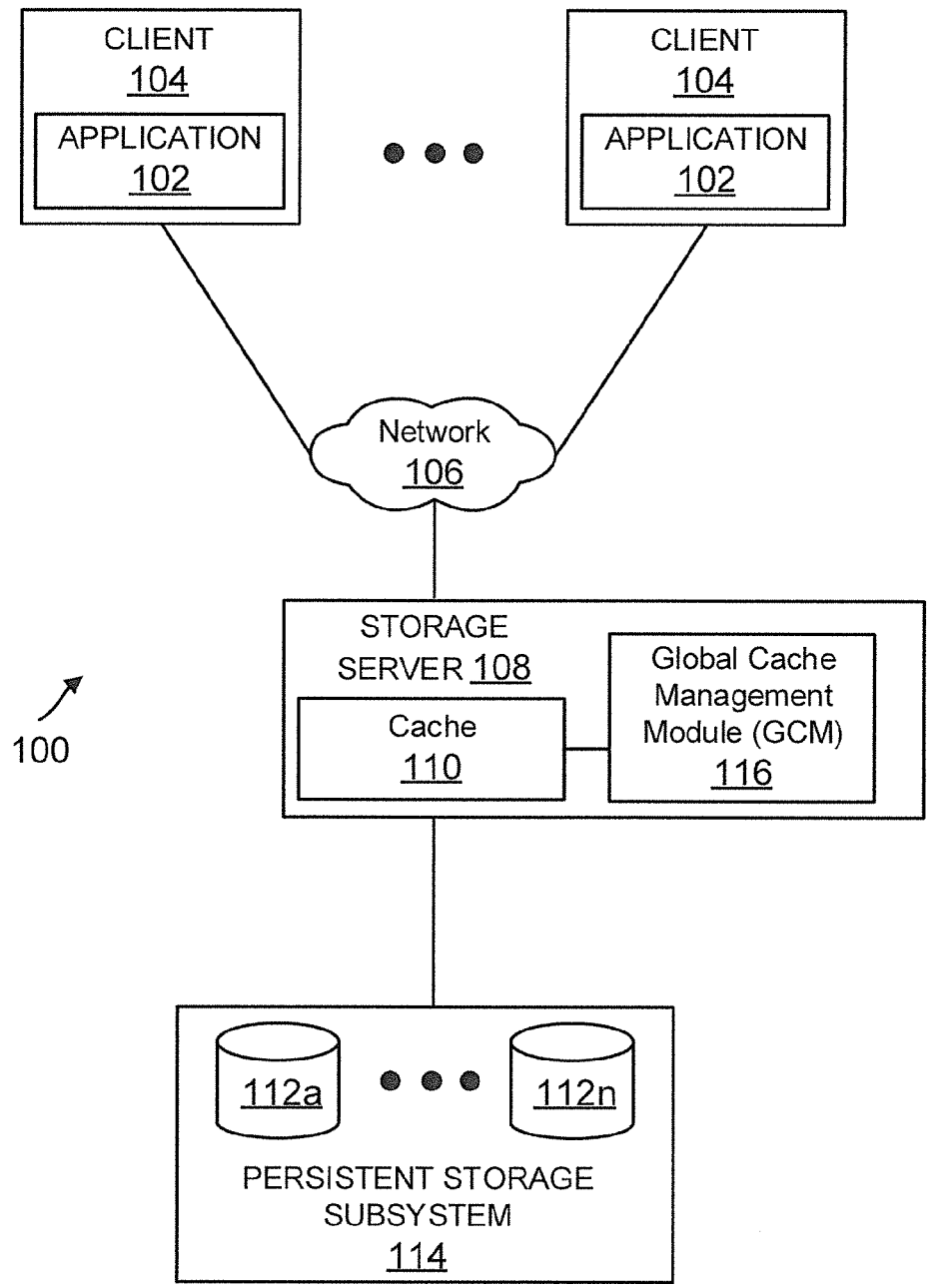
FIG. 1A provides a block diagram of an example of an operating environment for the various aspects disclosed herein.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Methods and systems for managing a cache in a multiprocessor environment are provided. This disclosure identifies a method for parallelizing cache management and input/output (I/O) request handling operations in a storage array controller. A method to process multiple I/O requests concurrently in a multiprocessing environment includes using cache pools. In one aspect, multiple cache pools are created within a cache storage device and individual I/O requests are assigned to their respective cache pools by using a hashing function. In one aspect, a hashing function operates on a volume/logical unit number (LUN) identifier and the logical block address (LBA) range for the I/O and assigns the I/O request to its respective cache pool.

In one aspect, each cache pool includes a set of physical cache blocks. The metadata for each cache pool is managed independently, and may include cache metadata, free cache block lists, hash lists, least recently used (LRU) cache block lists and other statistics. In another aspect, the metadata includes links to free cache block lists, hash lists, LRU lists, and the like. I/O requests pertaining to a cache pool can be processed independent of each other, thereby enabling multiple cache pools to process I/O requests in parallel on multiple processor cores.

Another aspect of the disclosure provides methods for handling "I/O hot spots", a condition when a large number of I/Os hash to the same Cache Pool, by providing a global cache pool which can be used to temporarily loan resources to the over loaded cache pool. The loaned resources are replenished when the free resources in the cache pool return above a certain threshold thereby maintaining a hysteresis curve for resource balancing and replenishment.

According to another aspect, a method also enables handling I/O requests that span cache pools by introducing a global cache management function that drives I/O requests that span across multiple cache pools asynchronously across individual cache pools.

System 100:

FIG. 1A is a block diagram illustrating an example network storage system 100 (or configuration) in which the various methods and systems (may be referred to as technology) introduced herein can be implemented. The network configuration described with respect to FIG. 1A is for illustration of a type of configuration in which the technology described herein can be implemented. As would be recognized by one skilled in the art, other network storage configurations and/or schemes could be used for implementing the technology disclosed herein.

As illustrated in the example of FIG. 1A, the network storage system 100 includes multiple client systems 104, a storage server 108, and a network 106 connecting the client systems 104 and the storage server 108. The storage server 108 is coupled with a number of mass storage devices (or storage containers) 112 in a mass storage subsystem 114. Some or all of the mass storage devices 112a-112n can be various types of storage devices, e.g., hard disk drives (HDDs), flash memory, solid-state drives (SSDs), hybrid storage drives (sometimes referred to as SSHDs), optical drives, tape storage, etc. For ease of description, the storage devices 112a-112n are discussed as disks herein. However as would be recognized by one skilled in the art, other types of storage devices could be used.

Illustratively, the network 106 can be embodied as an Ethernet network, a Fibre Channel network or any other network type and may comprise a local area network (LAN), a wide area network (WAN), a storage area network (SAN), combinations of the same and the like. Each client 104 can communicate with the storage server 108 over the network 106 by exchanging packets or frames of data according to pre-defined protocols, e.g., Transmission Control Protocol/Internet Protocol (TCP/IP). It is noteworthy that clients 104 may be coupled to the storage server 108 directly without having to go through a network adapter or network 106. The various aspects described herein are not limited to a network or a direct connection.

Although illustrated as distributed systems, in some aspects the storage server 108 and the mass storage subsystem 114 can be physically contained and/or otherwise located in the same enclosure. For example, the storage system 108 and the mass storage subsystem 114 can together be one of the E-series storage system products available from NetApp®, Inc., the assignee of the present application. The E-series storage system products can include one or more embedded controllers (or storage servers) and disks. Furthermore, the storage system can, in some aspects, include a redundant pair of controllers that can be located within the same physical enclosure with the disks. The storage system can be connected to other storage systems and/or to disks within or outside of the enclosure via a serial attached SCSI (SAS)/Fibre Channel (FC) protocol. Other protocols for communication are also possible including combinations and/or variations thereof.

In another aspect, the storage server 108 can be, for example, one of the FAS-series of storage server products available from NetApp®, Inc. The client systems 104 can be connected to the storage server 108 via the network 106, which can be a packet-switched network, for example, a local area network (LAN) or a wide area network (WAN). Further, the storage server 108 can be connected to the storage devices 112a-112n via a switching fabric (not illustrated), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the storage devices 112 available to the client systems 104 in a conventional manner. For example, each of the storage devices 112 can be implemented as an individual disk, multiple disks (e.g., a Redundant Array of Independent (or Inexpensive) Disks (RAID) group) or any other suitable mass storage device(s) including combinations and/or variations thereof. Storage of information in the mass storage subsystem 114 can be implemented as one or more storage volumes that comprise a collection of physical storage devices 112 cooperating to define an overall logical arrangement of volume block number (VBN) space on the volume(s). Each logical volume is generally, although not necessarily, associated with its own file system.

The storage devices within a logical volume/file system are typically organized as one or more groups, wherein each group may be operated as a RAID. Most RAID implementations, e.g., a RAID-6 level implementation, enhance the reliability/integrity of data storage through the redundant writing of data "stripes" across a given number of physical disks in the RAID group, and the appropriate storing of parity information with respect to the striped data. In computer data storage, data striping is a technique of segmenting logically sequential data, such as a file, so that consecutive segments are stored on different physical storage devices. Striping is useful when a processing device requests data more quickly than a single storage device can provide it. By spreading segments across multiple devices which can be accessed concurrently, total data throughput is increased. It is also a useful method for balancing I/O load across an array of disks. In conjunction with this, a "stripe" herein may refer to a block of data in data striping. An illustrative example of a RAID implementation is a RAID-6 level implementation, although it should be understood that other types and levels of RAID implementations may be used according to the technology described herein. One or more RAID groups together form an aggregate. An aggregate can contain one or more volumes.

The storage server 108 can receive and respond to various read and write requests from applications 102 running on the client systems (or clients) 104, directed to data stored in or to be stored in the storage subsystem 114.

Although the storage server 108 is illustrated as a single unit in FIG. 1A, it can have a distributed architecture. For example, the storage server 108 can be designed as a physically separate network module (e.g., "N-blade") and disk module (e.g., "D-blade") (not illustrated), which communicate with each other over a physical interconnect. Such an architecture allows convenient scaling, e.g., by deploying two or more N-blades and D-blades, all capable of communicating with each other through the physical interconnect.

A storage server 108 can be configured to implement one or more virtual storage servers. Virtual storage servers allow the sharing of the underlying physical storage controller resources, (e.g., processors and memory, between virtual storage servers while allowing each virtual storage server to run its own operating system) thereby providing functional isolation. With this configuration, multiple server operating systems that previously ran on individual servers, (e.g., to avoid interference) are able to run on the same physical server because of the functional isolation provided by a virtual storage server implementation. This can be a more cost effective way of providing storage server solutions to multiple customers than providing separate physical servers for each customer.

As illustrated in the example of FIG. 1A, storage server 108 includes a cache 110. The cache 110 can include, for example, a flash memory. Although illustrated in combination, cache 110 can be implemented separately from the storage server 108. Alternatively or additionally, cache 110 can be physically and/or functionally distributed.

According to one aspect, storage server 108 further includes a global cache management module 116 (may also be referred to herein as GCM 116) for managing the caching operations of storage server 108. Functionality and example organization of the global cache management module is described in more detail below.

Figure 1B:
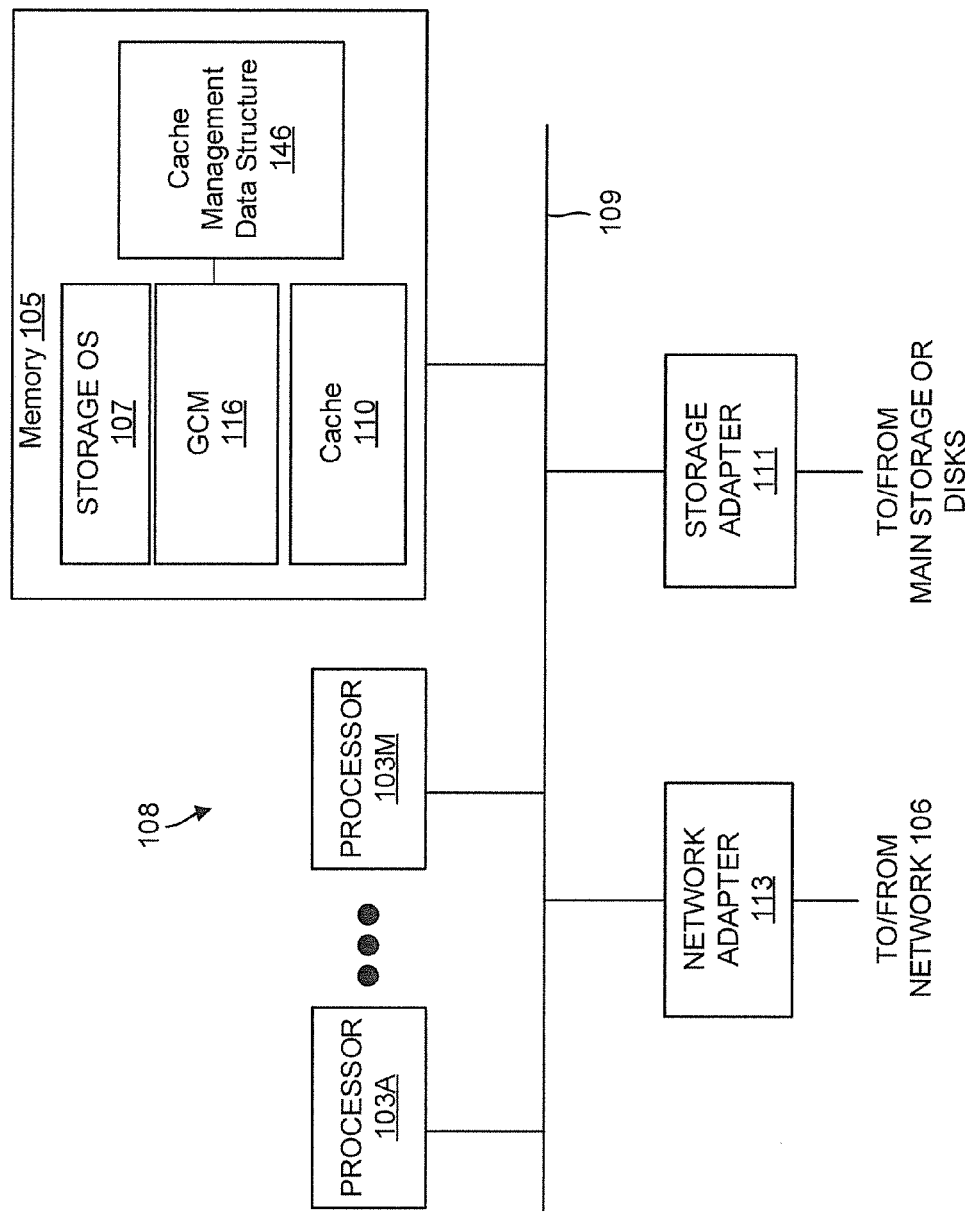
FIG. 1B provides a block diagram of an example of a storage server implementing a cache according to one aspect of the present disclosure.

Storage Server:

FIG. 1B is a block diagram illustrating an example of the architecture of a storage server 108 according to one aspect. The storage server is a processing system that provides storage services relating to the organization of information at storage devices 112a-112n of the mass storage subsystem 114.

In an illustrative aspect, the storage server 108 includes a processor subsystem 103 that includes one or more processors 103A-103M. The storage server 108 further includes a memory 105, a network adapter 113, and a storage adapter 111, at least some of which can be interconnected by an interconnect 109, e.g., a physical interconnect. Interconnect 109 may include a bus, for example.

The storage server 108 can be embodied as a single or multi-processor storage server executing a storage operating system 107 that preferably implements a high-level module, called a storage manager, to logically organize data as a hierarchical structure of named directories, files, and/or data "blocks" on the storage devices 112a-112n. A block can be a sequence of bytes of specified length.

The memory 105 illustratively comprises storage locations that are addressable by the processor(s) 103 and adapters 113 and 111 for storing software program code and data associated with the technology introduced here. For example, some of the storage locations of memory 105 can be used to store GCM 116 and a cache management data structure 146 used for managing cache 110 according to aspects herein. The GCM 116 and cache management data structure 146 are described below in detail.

In one aspect, memory 105 comprises volatile and/or non-volatile memory, such as Random Access Memory (RAM), flash memory, a HDD, SSD, a SSHD, EEPROM (electrically erasable programmable read only memory), memory stick or any other storage device. In one aspect, the memory comprises one or more SSDs as they are a non-volatile, relatively quickly accessed type of memory.

The storage operating system 107 (or firmware for a storage controller), portions of which are typically resident in memory and executed by one or more of the processing elements 103A-103M, functionally organizes the storage server 108 by (among other functions) invoking storage operations in support of the storage service provided by the storage server 108. It will be apparent to those skilled in the art that other processing and memory implementations, including various other non-transitory media, e.g., computer readable media, may be used for storing and executing program instructions pertaining to the technology introduced here. Similar to the storage server 108, the storage operating system 107 can be distributed, with modules of the storage system running on separate physical resources. In some aspects, instructions or signals can be transmitted on transitory computer readable media, e.g., carrier waves or other computer readable media.

The network adapter 113 can include multiple ports to couple the storage server 108 with one or more clients 104, or other storage servers, over point-to-point links, wide area networks, virtual private networks implemented over a public network (Internet) or a shared local area network. The network adapter 113 thus can include the mechanical components as well as the electrical and signaling circuitry needed to connect the storage server 108 to the network 106.

The storage adapter 111 cooperates with the storage operating system 107 to access information requested by clients 104. The information may be stored on any type of attached array of writable storage media, e.g., magnetic disk or tape, optical disk (e.g., CD-ROM or DVD), flash memory, SSD, HDD, SSHD, RAM, micro-electro mechanical and/or any other similar media adapted to store information, including data and parity information. However, as illustratively described herein, the information is stored on storage devices 112. The storage adapter 111 includes multiple ports having I/O interface circuitry that couples with the disks over an I/O interconnect arrangement, e.g., a conventional high-performance, Fibre Channel link topology.

The storage operating system 107 facilitates clients' access to data stored on the storage devices 112. In certain aspects, the storage operating system 107 implements a write—anywhere file system that cooperates with one or more virtualization modules to "virtualize" the storage space provided by storage devices 112a-112n. In certain aspects, a storage manager element of the storage operation system 107 logically organizes the information as a hierarchical structure of named directories and files on the storage devices 112. Each "on-disk" file may be implemented as a set of disk blocks configured to store information. As used herein, the term "file" means any logical container of data. The virtualization module(s) may allow the storage manager 410 to further logically organize information as a hierarchical structure of blocks on the disks that are exported as named logical units.

The interconnect 109 is an abstraction that represents any one or more separate physical buses, point-to-point connections, or both, connected by appropriate bridges, adapters, or controllers. The interconnect 109, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire," Fibre-Channel, Thunderbolt, and/or any other suitable form of physical connection including combinations and/or variations thereof.

GCM 116:

As set forth generally above, some of the storage locations of memory 105 can be used to implement a cache 110. Cache 110 generally is not visible to client systems 104 or their applications 102 but, according to one aspect, is managed by GCM 116 to provide temporary data storage for items being read from or written to persistent storage subsystem 114. Cache 110 can be particularly helpful to reduce the number of I/O operations communicated to and from persistent storage subsystem 114, which is often made up of slower memory, such as, for example, HDDs or the like.

GCM 116, in one aspect, manages the use of cache 110 and stores information about the amount of cache blocks that are in use, the amount of data in the cache that is "dirty" (i.e., has not been written to permanent storage 112), and the like. In a data striping implementation, cache 110 will typically store one or more data stripes in full, and GCM 116 may help decide when to flush each data stripe. In other aspects, however, it will be understood that data blocks of various sizes may be stored in cache and flushed to persistent storage without departing from the teachings herein.

In one aspect, GCM 116 may be a part of storage operating system 107 or may comprise an application running on top of storage operating system. In one aspect, GCM 116 includes or maintains a cache management data structure 146 that facilitates management of the cache 110, as described below.

Figure 1C:
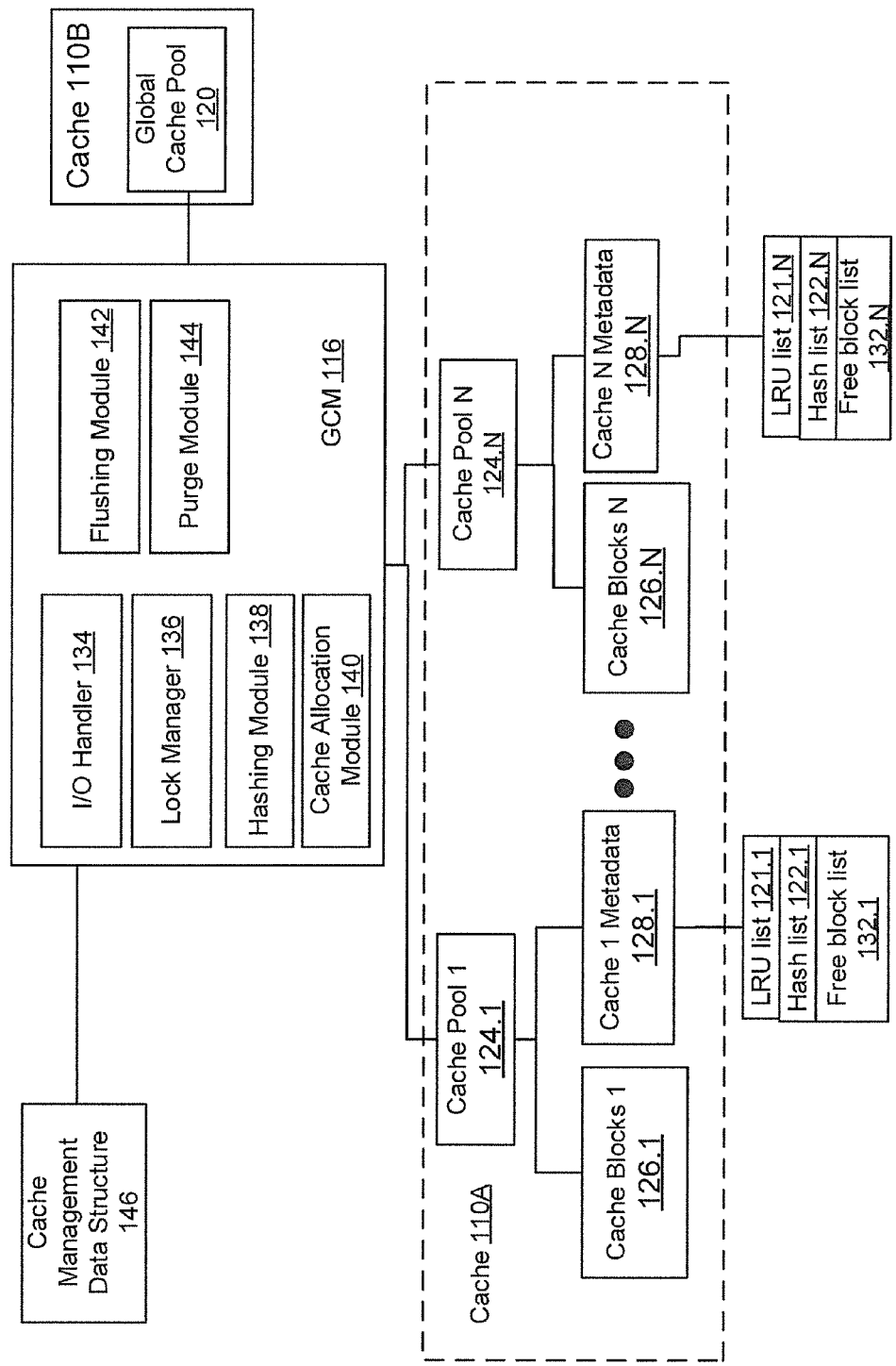
FIG. 1C provides a block diagram of a cache and cache management modules implemented according to one aspect of the present disclosure.

FIG. 1C illustrates an example of cache 110 and GCM 116 structures for implementing caching methods and systems described herein. In one aspect, all of the elements of FIG. 1C may be stored in memory 105; however, other memory or data storage may also be utilized. In one aspect, a cache 110 may comprise two parts, cache 110A and cache 110B—which may or may not comprise physically separate storage modules. The cache 110A, 110B may comprise any suitable memory for reading and writing data. In one aspect, the cache memory comprises volatile and/or non-volatile memory, such as Random Access Memory (RAM), flash memory, a hard disk (HDD), solid state drive (SSD), a hybrid drive (sometimes referred to as SSHD), EEPROM (electrically erasable programmable read only memory), memory stick or any other storage device. In one aspect, the memory comprises one or more SSDs as they are a non-volatile, relatively quickly accessed type of memory.

According to one aspect, cache 110A is divided up into separate cache pools 124.1-124.N, and cache 110B comprises a global cache pool 120. Each cache pool 124.x in turn includes one or more associated cache blocks 126.x which comprises some number of memory (or disk) sectors for storing data. In various aspects, cache blocks 126.1-126.N may comprise physical memory or may be implemented as part of a virtualized system.

Additionally, each cache pool 124.x stores or is associated with cache metadata (referred to as metadata 128.x). Metadata 128.x includes information to manage the associated cache pool, such as, for example, a volume identifier that identifies a volume associated with the cache pool, an indication of a first logical block address (LBA) that is associated with cache blocks within that cache pool, an indication of a state of cache blocks 126.x i.e. whether the cache blocks are written or not, a hash table look-up node that points to a hash list, a least recently use (LRU) node that points to a LRU list, flags, a lock count, and/or a lock wait queue.

In one aspect, each cache pool 124.x is also associated with a LRU list 120.x, a hash table (or list) 122.x, and a free block list 132.x. In one aspect, metadata 128.x includes a LRU node that points to the LRU list 121.x and a hash-table look-up node that points to the hash list 122.x. In one aspect, the LRU list 121.1 provides an indication of the general age of the last access of various cache blocks 126.x within the cache pool 124.x; those that have been least recently used may be reallocated as set forth herein. The hash-table 122.x is used to look-up a cache block/cache pool for a storage volume and stripe as described below in detail. In one aspect, the free block list 132.x provides an indication of free cache blocks or memory sectors within the cache pool 124.x's associated cache blocks 126.x set.

In one aspect, the global cache pool 120 also comprises one or more associated cache blocks which comprise some amount of memory that maps to disk sectors for storing data. The global cache pool 120 is not associated with any particular cache pool 124.x but can loan storage resources to any cache pool 124.x upon request, as will be described more fully herein (see FIG. 2B and associated discussion). In one aspect, the cache management data structure 146 maintains information for the GCM 116 operation and management of cache 110A, 110B. In one aspect it stores information about the global cache pool 120 and the allocation of its cache blocks as described more fully below.

In general, according to one aspect, the GCM 116 manages cache 110A, 110B and coordinates the processing of all I/O requests and other cache management functions. According to one aspect, the GCM 116 may comprise or may coordinate the use of multiple processors (103A-M, FIG. 1B) to handle different aspects of the caching functions as described in more detail herein.

GCM 116, according to one aspect, comprises an input/output (I/O) handler 134, a lock manager 136, a hashing module 138, a cache allocation module 138, a flushing module 142, and a purge module 144. Each will be described more fully herein. Generally, I/O handler 134 may accept read and write I/O requests for handling by the GCM 116. The hashing module is described in more detail in relation to FIGS. 1D and 2A. The lock manager 136 and cache allocation module 138 are described in more detail with relation to FIG. 2B. The flushing module 142 is described in more detail with relation to FIG. 2D, and the purge module 144 is described in more detail with relation to FIG. 2E.

In one aspect, the number, N, of cache pools 124.x may be related to the number, M, of processors or CPU cores available to handle caching operations. For example, in one aspect, there are more cache pools 124.x than there are processors. A greater number of cache pools increases the chances of load-balancing I/O operations (or caching I/O operations) across the pools and also decreases the chances of hot spots.

According to one aspect, GCM 116 receives I/O requests from a storage operating system 107. The I/O requests may originate from clients 104, for example. The GCM's I/O handler 134 processes every I/O request and passes it to the hashing module 138, where a hashing function is used to determine which cache pool 124.x will handle that I/O request. In one aspect, the hash function operates on the I/O requests' destination volume ID and its LBA range. In another aspect, the stripe of the I/O request may be used. For a particular volume ID and a given LBA range, the hashing function will always hash to the same cache pool 124.x.

Further, in one aspect, GCM 116 coordinates I/O requests that span multiple cache pools (e.g. I/Os that are spread across multiple stripes). In such a scenario, the I/O are deemed complete when the processing of the I/O completes across all the affected cache pools.

According to one aspect, GCM 116 also coordinates operations that span an entire volume, such as cache purge on volume deletion (using flushing module 142). GCM 116 also coordinates cache blocks allocated across all cache pools 124.1-N for a particular volume or volume group (VG). In one aspect, GCM 116 oversees dirty limits for a volume group in order to flush cache in a timely manner so as to maintain failover time requirements, as volume group cache blocks may span multiple cache pools 124. A VG includes more than one storage volume.

In one aspect, GCM 116 loans cache blocks from the global cache pool 120 in cache block or sector chunks that are larger than a triggering I/O request's block size. In this manner, the loan likely benefits multiple I/Os with only one fetch from the global cache pool 120.

In one aspect, loaned cache blocks are returned to the global pool 120 once the number of free blocks in the borrowing cache pool 124.x returns above a particular threshold. For example, if the number of sectors loaned is "X", then the replenishment occurs when the number of free blocks is "Y" where Y>X.

Apart from a global dirty limit for volume groups, there may also be a per-cache pool dirty limit, according to one aspect. This may help to ensure that some number of cache blocks within a pool are reserved for completing requests for parity blocks.

According to one aspect, cache insert, search, and reclaim from LRU methods may operate much the same as in a conventional cache system yet operates on a per-cache pool basis. With algorithms being applied on a per-pool basis, the working set of data structures, e.g. the size of free lists, LRU lists, hash tables, and the like are much smaller as the number of cache blocks within a cache pool 124 is a subset of the total number of cache blocks within the system. The reduction of the working set, in one aspect, may greatly reduce insert, search, and reclamation times, thereby speeding up the processes. Therefore, aspects of this disclosure may not only quicken the searches through smaller working sets, but they may also enable multiple processors or CPU cores to conduct parallel searches through their own sets of (smaller) lists.

Figure 1D:
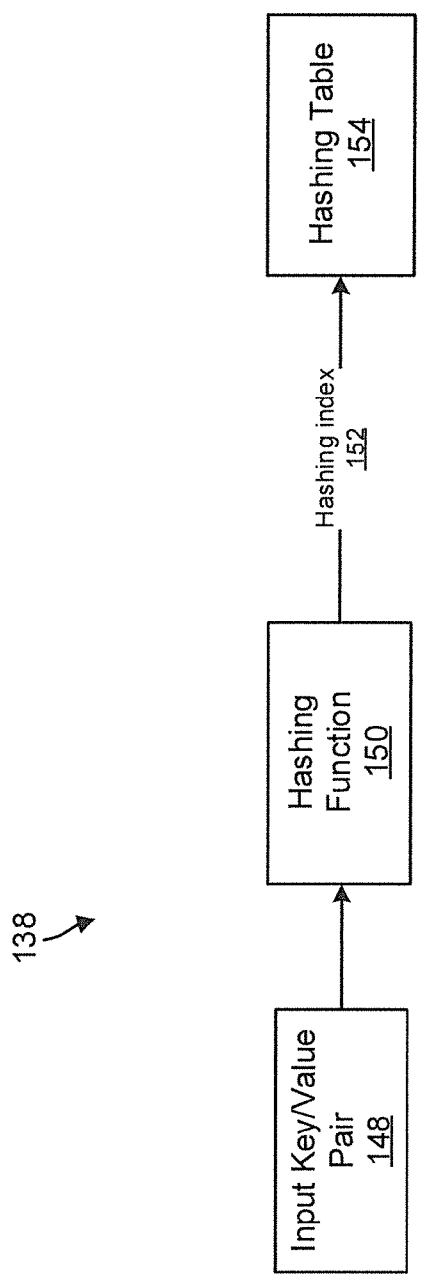
FIG. 1D illustrates an example of a hash function module used according to the disclosure herein.

Hashing Module:

FIG. 1D illustrates hashing module 138 used for determining which cache pool 124.x should be assigned an I/O request (or a portion thereof), according to one aspect. In one aspect, a key/value pair are used as input 148 to a hashing function 150. For example, a hashing function 150 may use a destination volume ID and its LBA range for the I/O request as input 148. The hashing function 150 processes the input and outputs a hashing index 152. This hashing index 152 is used to search a hashing data structure (or table) 154. The hashing table 154 includes a plurality of array objects where each object includes a head of a doubly linked list 122.x. In one aspect, the list 122.x includes one or more cache control blocks (CCBs), each of which includes a pointer to a cache block, the volume number, the starting LBA in the cache block, the type of data in the cache block, a bitmap that indicates which sectors in the cache block contain data, a bitmap that indicates whether the data is clean or dirty, and other metadata used to manage the cache block. In an example, the hashing index may be derived as follows:

HashStripe=(first LBA of I/O request)/(number of stripes in volume)

HashStripeKey=HashStripe*(prime number less than 2^7 to randomize)

HashVolumeKey=Function of volume ID and Max volumes supported

HashIndex=(HashStripeKey+HashVolumeKey) % NUM_CACHE_POOLS

Process Flows:

Turning now, to FIGS. 2A-2E, various flow diagrams illustrate the various aspects of the present disclosure. Starting with FIG. 2A, an overall method for processing an I/O write request that is cached is illustrated. At block B250, an I/O write request is received by the cache management module. In one aspect, the I/O write request may be handled by a storage operating system, for example, and it may determine that the I/O request should be cached. The storage operating system then hands the processing over to GCM 116 and its I/O handler 134. In another aspect, GCM 116 and/or the I/O handler 134 will intercept all I/O requests and make a determination of whether or not to cache the I/O. In yet another aspect, all I/O write requests may be cached.

At block B252, the I/O request is examined for target metadata, which may, in one aspect, for example, include a target volume identifier and a LBA range. The term target as used herein means, the storage device where the data is eventually persisted. At block B254, the extracted target metadata is used in a hash function to determine which cache pool 124.x should handle the caching for the I/O request.

At block B256, the cache pool 124.x is assigned based on the result of the hash function. In block B258, the I/O write request is cached and processed for storage at the assigned cache pool 124.x at block B258.

In one aspect, GCM 116 assigns an available processor (such as processor 103A, see FIG. 1B) to process the I/O request with respect to the assigned cache pool 124.x. In another aspect, each cache pool 124 may be assigned to set processors and all or most activities relating to that cache pool are carried out by the assigned processor. In an aspect, while cache pools may be assigned to different processors at different times, GCM 116 assigns I/O requests relating to a given cache pool 124.x to one processor at any given time. This restriction helps prevent two processors from carrying out conflicting tasks with relation to one cache pool 124.x at the same time.

Further, it is to be understood that a similar process may be used with I/O read requests to determine which cache pool 124.x would be assigned the requested data, which could then determine whether or not it has cached data with which to respond to the read request.

Cache Block Allocation:

In one aspect, cache block allocation with different cache pools 124.x considers the possibilities for "I/O hot spots" within a cache pool 124.x and allocates cache blocks in a manner to avoid or minimize a scenario wherein one cache pool 124.x has free resources while another cache pool 124.y has full resources or blocks preventing it from handling I/O requests efficiently.

Other considerations in various aspects of cache allocation include that (1) frequent swapping and/or loaning of cache blocks across cache pools 124 can create an imbalance of blocks 126 between pools, which can lead to a lot of thrashing when trying to borrow from other pools; (2) contentions in the cache block allocation code path likely will be detrimental to the system performance especially under stress; and (3) more cache pools 124 than the number of processors/cores and a good hash algorithm helps load balance the allocation across multiple cache pools.

In one aspect, the global cache pool 120 is managed by GCM 116 in general and cache allocation module 140 in particular, to provide improved caching and cache block allocation. In one aspect, most cache blocks 126 are allocated to cache pools 124.1-N with a relatively small percentage of cache blocks allocated to the global cache pool 120. Generally, this option helps each cache pool 124.1-N to be self-contained as much as possible. In one aspect, if there are no cache blocks 126 available in a cache pool 124.x's free block list 132.x, then cache blocks may be reclaimed from the pool's LRU list. In one aspect, using a lookup into the LRU list 121.x for free cache blocks is a lock free operation (because it is contained within a single cache pool 124.x). In one aspect, when cache blocks cannot be reclaimed from the LRU list 121.x, then the cache allocation process seeks to borrow from the global pool 120.

In one aspect, operations involving the global pool 120 is protected by a lock (for example, a spinlock), which may be managed by lock manager 136. However, lookups into the global pool 120 may be optimized for batch processing. Cache blocks may be borrowed from the global pool 120 in reasonably large sets to accommodate large number of I/O requests, including sequential I/O requests.

Cache blocks that are borrowed from the global pool 120 are released back to the global pool when the borrowing cache pool 124.x's number of free blocks (for example, as understood from the free block list 132.x) are more than a threshold. In one aspect, the number of free blocks is a certain amount more than the number of loaned cache blocks for the replenishment to start. In one aspect, the threshold is set to create a hysteresis curve for borrowing and return operations which will generally help prevent thrashing.

In one aspect, GCM 116 and/or the cache allocation module 140 prevents any single cache pool 120 from loaning more than a specified percentage of the global pool 120's free blocks.

In one aspect, the cache allocation module 140 may execute a tunable process so that the number of lookups to the global pool 120 can be reduced or minimized. For read intensive workloads, especially for random reads, it is expected that the allocation may be from the free list 132.x or cache blocks may be reclaimed from the LRU list 121.x. So, global pool 120 lookups and hence contention for cache block allocation is minimized.

In one aspect, each cache pool has an upper limit for cache block allocation. Whenever the number of allocated cache blocks from the cache pool goes beyond that threshold value, a cache flush may be triggered (in accordance with cache flush module 142, in one aspect). The term flush as used herein means, moving data from the cache to a persistent storage device. This cache flush trigger may be in addition to the cache flush that is normally triggered at the VG (volume group) level when the number of cache blocks allocated per VG goes above a threshold limit (or a dirty limit). Even though the cache flush may be triggered due to demand within a particular cache pool, the cache flush may preferably still be handled at the VG level, i.e. across all cache pools 124.1-N.

Figure 2A:
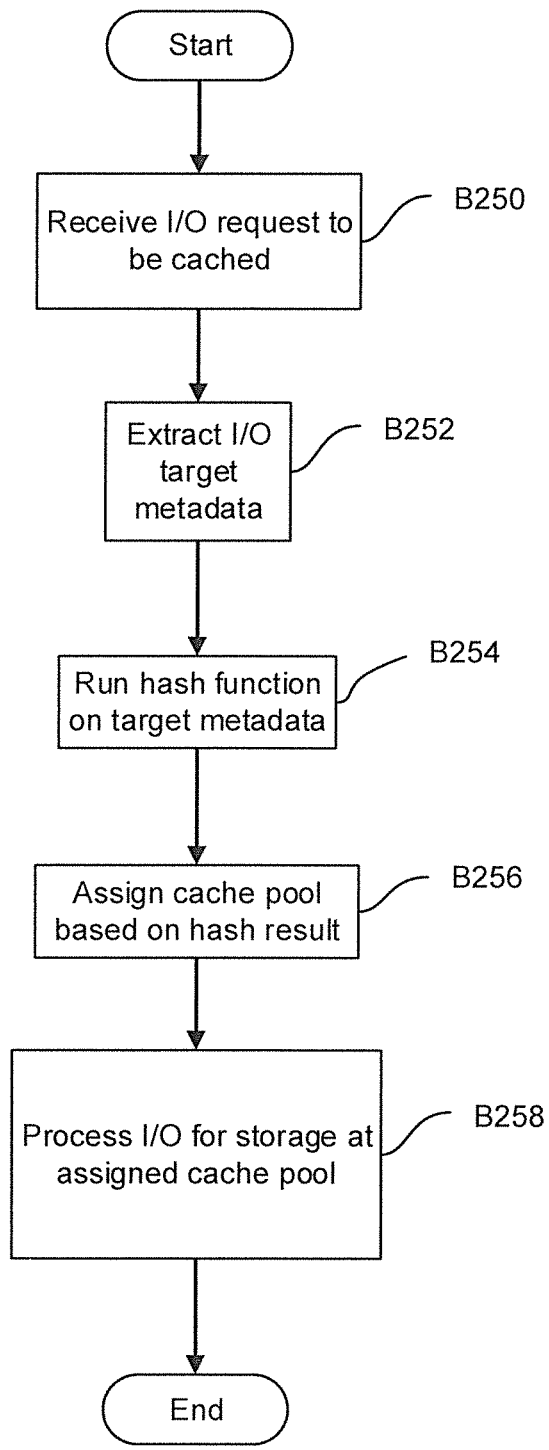
FIGS. 2A-2E show various process flow diagrams, according to the various aspects of the present disclosure.
Figure 2B:
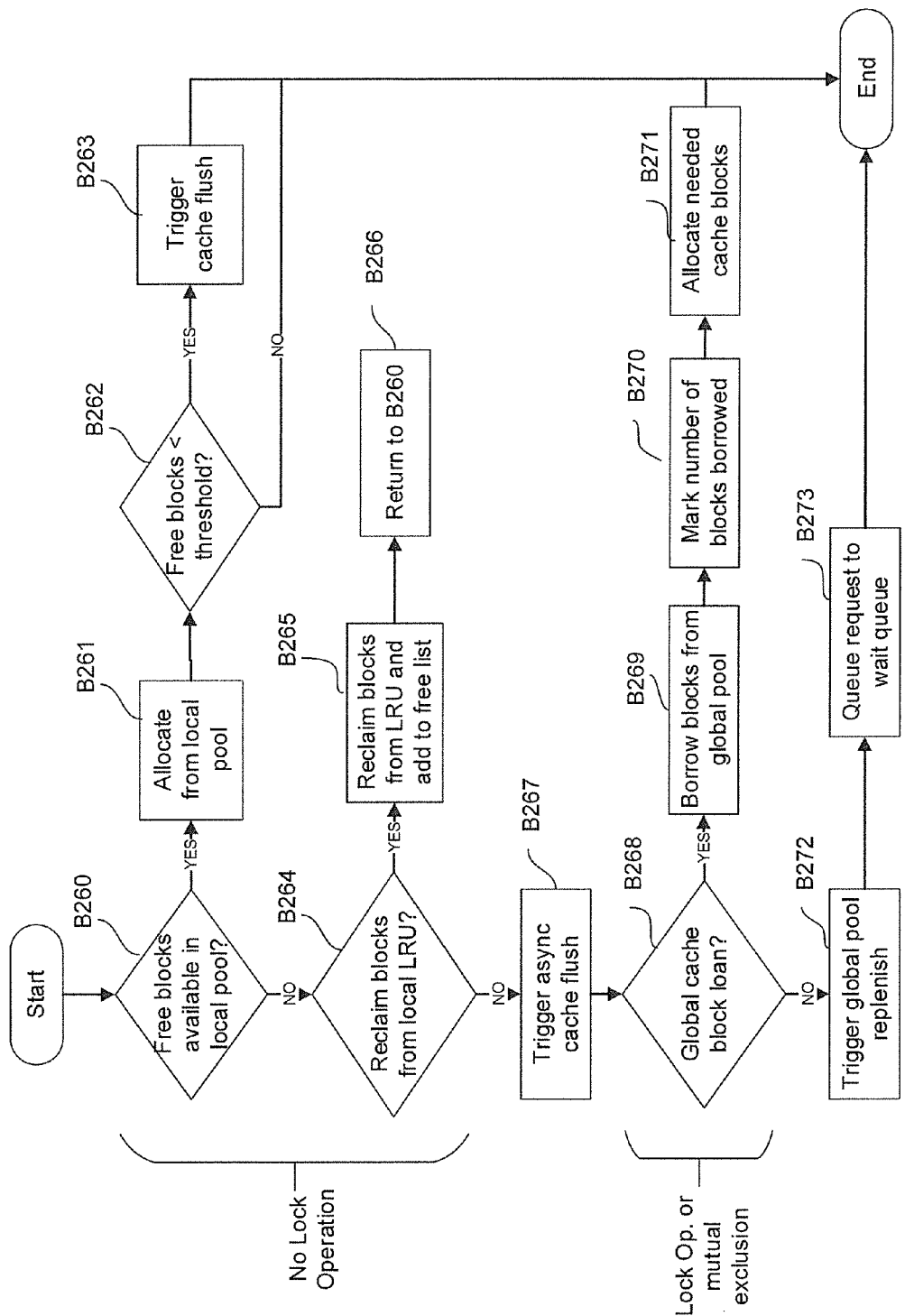
Figure 2C:
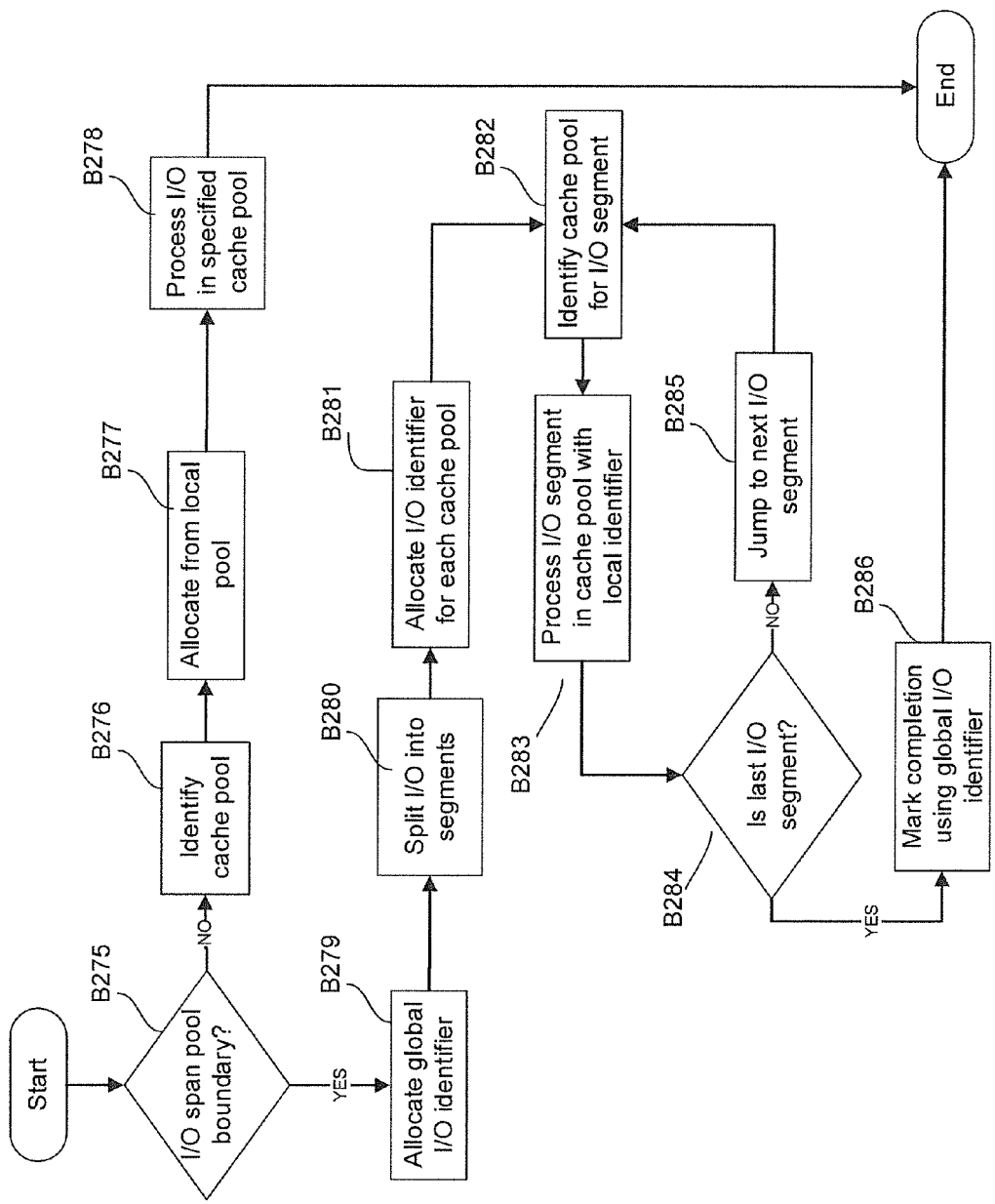

FIG. 2B illustrates a cache allocation process for a cache pool 124.x that may be operated by or in conjunction with cache allocation module 140, according to one aspect. It is expected that in general the cache pools 124.1-N can operate independently on separate processors or CPU cores 103A-M and only in certain circumstances impose on the GCM 116's global cache pool 120.

Starting at block B260, the cache allocation module 140 determines whether a cache pool 124.x has free blocks available (referring to associated free block list 132.x). If there are free blocks available, the cache blocks 126.x are allocated from the cache pool 124.x at block B261. Data from an incoming I/O write request can then be stored, for example. Data for a read request can also be retrieved from disk and stored in a cache block allocated from the cache pool. At block B262, the cache allocation module 140 checks to see if the number of free blocks after the allocation is less than a threshold. If it is, then the process triggers a cache flush operation to free blocks for future requests at block B263. The cache flush operation is described below in detail with respect to FIG. 2D. If there are sufficient free blocks remaining, the method simply exits.

Returning to block B260, if the cache pool does not have sufficient free blocks, the process proceeds to block B264. At block B264, the cache allocation module 140 determines whether blocks can be reclaimed from the LRU list 121.x corresponding to the cache pool. If so, the cache blocks are reclaimed at block B265. At block B266, the process returns to block B260 to determine if the newly freed blocks are sufficient to allocate as needed to handle the incoming I/O request. In an alternative aspect, the checks identified in blocks B262 and B263 may also be carried out after the allocation in block B266. In one aspect, all of the above blocks can be accomplished without a locking operation, which may be overseen by lock manager 136.

If it is not possible to reclaim blocks from the LRU list 121.x (block B264), the process triggers an asynchronous cache flush operation at block B267. Further, in one aspect, the lock manager 136 may implement a lock on particular cache operations or a mutual exclusion prior to continuing to block B268.

Continuing to block B268, the cache allocation module 140 determines if cache blocks can be borrowed from the global cache pool 120. This determination may be based on: the number of free blocks that are not allocated from the global cache pool, the number of blocks already borrowed by the given cache pool 124.x, other system variables, combinations of the same, and the like.

If the loan can occur, then at block B269, cache blocks from the global cache pool 120 are allocated to the cache pool 124.x on a temporary basis, and the cache allocation module 140 marks the number of blocks borrowed in cache management data structure 146 at block B270. In one aspect, this count may be handled by the cache allocation module 140 and can help control whether or not future loan requests are available to a given cache pool 124.x.

At block B271, the cache allocation module 146 allocates needed cache blocks (including or exclusively from the borrowed cache blocks of the global cache pool 120) to handle the I/O write request before exiting. In one aspect, the lock manager 136 may release the hold on other cache operations after block B269, which allocates the global pool cache blocks. In other aspects, the lock may be released upon exit from the method, for example. In one aspect, these blocks operate under a lock operation or mutual exclusion so that only one process or thread (one cache pool 124.x) alters the global pool at a time.

If the global cache pool cannot loan cache blocks (for example, because the requesting cache pool has reached its borrowing limit, other cache pools have already borrowed all of the cache blocks from the global pool, or the like), the process continues to block B272 where a global pool replenish operation is triggered. In one aspect, for example, the GCM 116 takes back loaned cache blocks from one or more cache pools 124.1-N and updates cache management data structure 146. At block B273, the cache pool then queues the I/O requests to a wait queue. In an aspect, other I/O requests that are received during a global pool replenish will also be queued to be processed after the replenish operation completes.

A general method for processing an I/O request is described in FIG. 2A, according to one aspect, but systems and methods described herein may also handle I/O requests that span cache pools 124.1-N. A method for such handling, according to one aspect, is described in FIG. 2C.

Starting at block B275, the process (as carried out by GCM 116, for example) determines if the I/O request spans cache pool boundaries. This means that the I/O requests involves multiple cache pools. If not, the process proceeds much as described with respect to FIG. 2A. At block B276, the assigned cache pool 124.x is determined (using a hashing function as described in FIG. 1D, for example). At block B277, cache blocks 126.x from the assigned cache pool 124.x are allocated for the I/O request (according to FIG. 2B, in one aspect). At block B278, the I/O request is processed with those cache blocks (such as by storing the data of a write I/O request). It will be understood that a process can similarly read data from the cache based on data previously stored in the cache pool 124.x.

Returning to block B275, if the I/O request does span one or more cache pool boundaries, the process proceeds to allocate a global I/O identifier at block B279. The global identifier may be stored at data structure 146 and is used to track progress of the I/O when multiple processors and cache pools may be involved at different times.

At block B280, the I/O request is then split into segments, and each segment is also allocated an I/O identifier at block B281. This may be performed by I/O handler 134 in one aspect. The segment I/O identifiers may be used to identify each I/O segment of a global I/O and may be stored in cache management data structure 146. At block B282, the cache pool 124.y is identified for a segment. This information is stored at data structure 146 and at block B283 that I/O segment is processed with the identified cache pool.

At block B284, the process (or GCM 116) determines if all of the segments have been processed. If not, at block B285, the next I/O segment is selected, and the method returns to block B282 to process that next segment. When all of the segments have been processed, at block B286, the I/O request is marked complete using the global identifier.

Figure 2D:
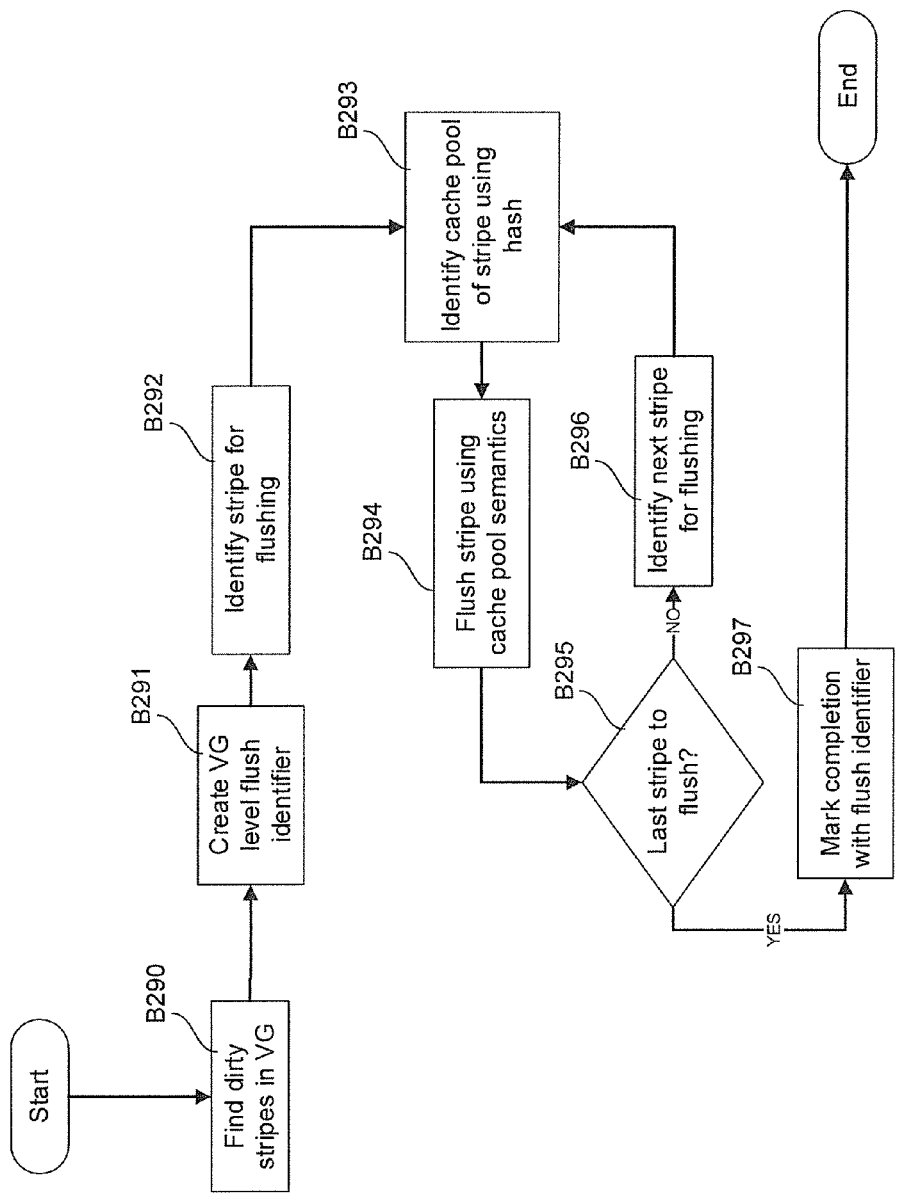

Cache Flushing:

FIG. 2D illustrates a flow diagram for a method of cache flushing. Starting at block B290, the flushing module 142 determines dirty stripes in a volume group. The flushing module 142 may obtain this information from the storage operating system. At block B291, a volume group level flush identifier is created. The identifier is used to track the flushing operation at the VG level.

At block B292, a stripe is identified for flushing. At block B293, the cache pool handling that stripe is determined based on the hashing algorithm described herein for identifying/assigning cache pools.

At block B294, the stripe is flushed by the cache pool to a storage device. The cache pool 124.y may move cache block(s) 126.y to the LRU list 121.y as needed or move it to the Free List 132.y and may or may not erase the data in the newly freed cache block(s) 126.y.

At block B295, the method tests to see if all stripes have been flushed for the volume group. If there are more, block B296 identifies the next stripe for flushing and returns to block B293. If all stripes have been flushed, the method marks the operation completed with the flush identifier at block B297.

Figure 2E:
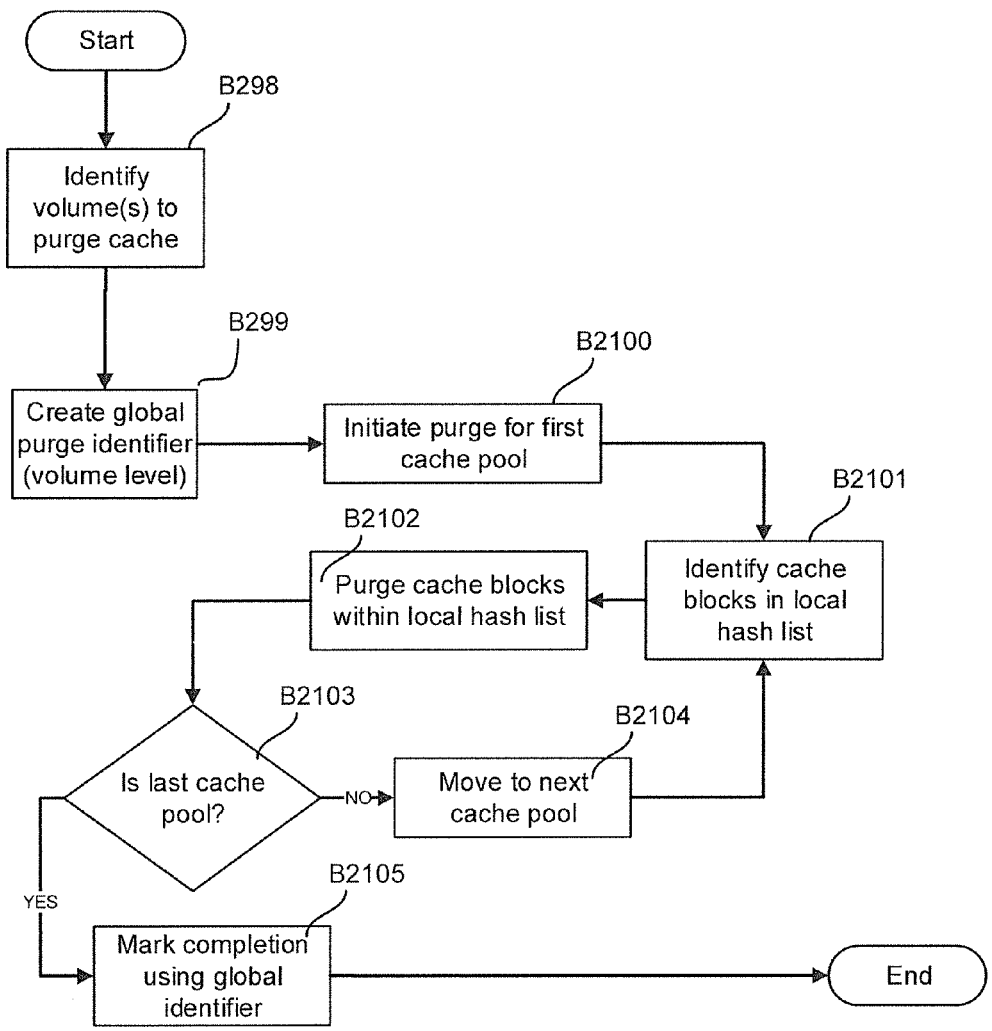

Cache Purge:

FIG. 2E next illustrates a cache purge process according to one aspect of the disclosure. Starting at block B298, a volume or volumes are identified to be purged which means that the data will be erased and opened up for other use.

At block B299, a global identifier for the purge operation is created to track the purge operation at the volume level. At block B2100, the purge operation is initiated for a first cache pool 124.1. At block B2101, the purge module 144 identifies cache blocks 126.1 from the local hash list 122.1, and at block B2101, the identified cache blocks are purged or erased; these blocks are then returned to the cache pool's free block list 132.x. At block B2103, the method determines whether that was the last cache pool 124.x. If not, the method moves to the next cache pool at B2104 and returns to block B2101 for additional processing. If the last cache pool has been processed, the purge is marked complete based on the global identifier at block B2105.

Figure 3:
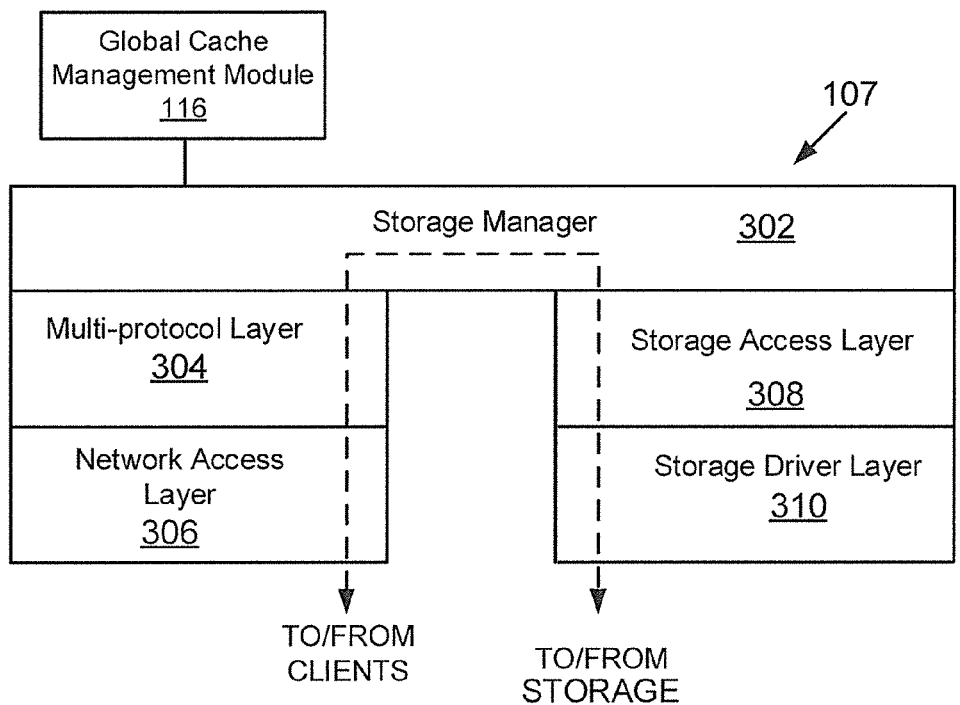
FIG. 3 shows an example of a storage operating system, used according to one aspect of the present disclosure.

Storage Operating System:

FIG. 3 is a schematic diagram illustrating an example of the architecture of a storage operating system 107 for use in a storage server 108. As discussed above, GCM 116 is a part of storage operating system 107 or interacts with it according to various aspects described herein.

In some aspects, the storage operating system 107 can be the NetApp® Data ONTAP® operating system available from NetApp, Inc., Sunnyvale, Calif. that implements a Write Anywhere File Layout (WAFL®) file system (without derogation of any trademark rights). However, another storage operating system may alternatively be designed or enhanced for use in accordance with the technology described herein.

The storage operating system 107 can be implemented as programmable circuitry programmed with software and/or firmware, or as specially designed non-programmable circuitry (i.e., hardware), or in a combination and/or variation thereof. In the illustrated aspect, the storage operating system 107 includes several modules, or layers. These layers include a storage manager (or file system manager) 302, which is a functional element of the storage operating system 107. The storage manager 302 imposes a structure (e.g., one or more file systems) on the data managed by the storage server 108 and services read and write requests from clients 104.

To allow the storage server to communicate over the network 106 (e.g., with clients 104), the storage operating system 107 can also include a multi-protocol layer 304 and a network access layer 306, logically under the storage manager 302. The multi-protocol layer 304 implements various higher-level network protocols, e.g., Network File System (NFS), Common Internet File System (CIFS), Hypertext Transfer Protocol (HTTP), Fibre Channel, Infini-Band, Serial Attached Small Computer System Interface (SAS) and/or Internet small computer system interface (iSCSI), to make data stored on the storage devices 112 available to users and/or application programs.

The network access layer 306 includes one or more network drivers that implement one or more lower-level protocols to communicate over the network, e.g., Ethernet, Internet Protocol (IP), TCP/IP, Fibre Channel Protocol and/or User Datagram Protocol/Internet Protocol (UDP/IP).

Also, to allow a device to communicate with a storage subsystem (e.g., storage subsystem 105 of FIG. 1A), the storage operating system 107 includes a storage access layer 308 and an associated storage driver layer 310 logically under the storage manager 302. The storage access layer 308 implements a higher-level storage redundancy algorithm, e.g., RAID-4, RAID-5, RAID-6, or RAID DP®. The storage driver layer 310 implements a lower-level storage device access protocol, e.g., Fibre Channel Protocol or SAS.

Also shown in FIG. 3 is the path 312 of data flow through the storage operating system 107, associated with a read or write operation, from the client interface to the storage interface. Thus, the storage manager 302 accesses a storage subsystem, e.g., storage system 114 of FIG. 1A, through the storage access layer 308 and the storage driver layer 310.

Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet, to provide computing as a service.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services.

Thus, methods and systems for caching have been described. Note that references throughout this specification to "one aspect" or "one aspect" mean that a particular feature, structure or characteristic described in connection with the aspect is included in at least one aspect of the present disclosure. Therefore, it is emphasized and should be appreciated that two or more references to "one aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
splitting a cache storage into a plurality of cache pools, each cache pool comprising storage space that stores a plurality of cache blocks that store data related to an input/output ("I/O") request;
receiving the I/O request;
extracting a volume identifier and at least one Logical Block Address (LBA) from the I/O request;
providing the volume identifier and the at least one LBA to a hash function;
determining, by the hash function, a hash index corresponding to the volume identifier and the at least one LBA, wherein determining the hash index includes:
determining, using the at least one LBA and a number of stripes in a volume, a hash stripe corresponding to the I/O request;
assigning the I/O request to one of the plurality of cache pools that corresponds to the determined hash index; and
writing, by a processor assigned to the assigned cache pool, data of the I/O request to one or more of the cache blocks associated with the assigned cache pool.

2. The method of claim 1, further comprising:
receiving a second I/O request;
assigning the second I/O request to a second one of the cache pools based on the hash function; and
writing, by a second processor assigned to the assigned second cache pool, data of the second I/O request to one or more of the cache blocks associated with the assigned second cache pool, wherein the second processor is different than the processor.

3. The method of claim 2, wherein the writing of the data of the I/O request and the writing of the data of the second I/O request occur during overlapping time periods.

4. The method of claim 1, further comprising:
reserving a number of cache blocks for a global cache pool; and
when the assigned cache pool has too few empty cache blocks, borrowing at least one cache block from the global cache pool and associating the borrowed at least one cache block with the assigned cache pool.

5. The method of claim 4, further comprising: releasing the borrowed at least one cache block back to the global cache pool.

6. The method of claim 1, wherein the I/O request spans multiple cache pools.

7. A non-transitory machine readable medium having stored thereon instructions for performing a method comprising machine executable code which when executed by at least one machine, causes the machine to:
split a cache storage into a plurality of cache pools, each cache pool comprising storage space that stores a plurality of cache blocks that store data related to an input/output ("I/O") request;
receive the I/O request;
extract a volume identifier and at least one Logical Block Address (LBA) from the I/O request;
provide the volume identifier and the at least one LBA to a hash function;
determine, by the hash function, a hash index corresponding to the volume identifier and the at least one LBA, wherein determining the hash index includes:
determining, using the at least one LBA and a number of stripes in a volume, a hash stripe corresponding to the I/O request:
assign the I/O request to one of the plurality of cache pools that corresponds to the hash index; and
write, by a processor assigned to the assigned cache pool, data of the I/O request to one or more of the cache blocks associated with the assigned cache pool.

8. The non-transitory machine readable medium of claim 7, further comprising instructions to:
receive a second I/O request;
assign the second I/O request to a second one of the cache pools based on the hash function; and
write, by a second processor assigned to the assigned second cache pool, data of the second I/O request to one or more of the cache blocks associated with the assigned second cache pool, wherein the second processor is different than the processor.

9. The non-transitory machine readable of claim 8, wherein the writing of the data of the I/O request and the writing of the data of the second I/O request occur during overlapping time periods.

10. The non-transitory machine readable medium of claim 7, further comprising instructions to:
reserve a number of cache blocks for a global cache pool; and
when the assigned cache pool has too few empty cache blocks, borrow at least one cache block from the global cache pool and associating the borrowed at least one cache block with the assigned cache pool.

11. The non-transitory machine readable medium of claim 10, further comprising instructions to release the borrowed at least one cache block back to the global cache pool.

12. The non-transitory machine readable medium of claim 7, wherein the I/O request spans multiple cache pools.

13. A computing device comprising:
a memory containing non-transitory machine readable medium comprising machine executable code having stored thereon instructions; and
a processor coupled to the memory, the processor configured to execute the machine executable code to cause the processor to:
split a cache storage into a plurality of cache pools, each cache pool comprising storage space that stores a plurality of cache blocks that store data related to an input/output ("I/O") request;
receive the I/O request;
extract a volume identifier and at least one Logical Block Address (LBA) from the I/O request;
provide the volume identifier and the at least one LBA to a hash function;
determine, by the hash function, a hash index corresponding to the volume identifier and the at least one LBA, wherein determining the hash index includes:
determining, using the at least one LBA and a number of stripes in a volume, a hash stripe corresponding to the I/O request;
assign the I/O request to one of the plurality of cache pools that corresponds to the hash index; and
write, by a processor assigned to the assigned cache pool, data of the I/O request to one or more of the cache blocks associated with the assigned cache pool.

14. The computing device of claim 13, wherein the processor is further to:
receive a second I/O request;
assign the second I/O request to a second one of the cache pools based on the hash function; and
write, by a second processor assigned to the assigned second cache pool, data of the second I/O request to one or more of the cache blocks associated with the assigned second cache pool, wherein the second processor is different than the processor.

15. The computing device of claim 14, wherein the writing of the data of the I/O request and the writing of the data of the second I/O request occur during overlapping time periods.

16. The computing device of claim 13, wherein the processor is further to:
reserve a number of cache blocks for a global cache pool; and
when the assigned cache pool has too few empty cache blocks, borrow at least one cache block from the global cache pool and associating the borrowed at least one cache block with the assigned cache pool.

17. The computing device of claim 16, wherein the processor is further configured to release the borrowed at least one cache block back to the global cache pool.

18. The computing device of claim 13, wherein the I/O request spans multiple cache pools.

19. The method of claim 1, wherein determining the hash index further includes:
applying a randomizing multiplier to the determined hash stripe.

20. The non-transitory machine readable medium of claim 7, wherein determining the hash index further includes:
applying a randomizing multiplier to the determined hash stripe.

21. The computing device of claim 13, wherein determining the hash index further includes:
applying a randomizing multiplier to the determined hash stripe.

* * * * *